US010698246B2

(12) United States Patent
Cheng et al.

(10) Patent No.: US 10,698,246 B2
(45) Date of Patent: Jun. 30, 2020

(54) DISPLAY SCREEN, DISPLAY SCREEN ASSEMBLY, AND TERMINAL

(71) Applicant: Guangdong Oppo Mobile Telecommunications Corp., Ltd., Dongguan, Guangdong (CN)

(72) Inventors: Jiao Cheng, Guangdong (CN); Yanhao Hu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 94 days.

(21) Appl. No.: 15/512,286

(22) PCT Filed: Mar. 28, 2016

(86) PCT No.: PCT/CN2016/077554
§ 371 (c)(1),
(2) Date: Mar. 17, 2017

(87) PCT Pub. No.: WO2016/169394
PCT Pub. Date: Oct. 27, 2016

(65) Prior Publication Data
US 2017/0285394 A1    Oct. 5, 2017

(30) Foreign Application Priority Data
Apr. 20, 2015    (CN) .......................... 2015 1 0189110

(51) Int. Cl.
| G02F 1/1335 | (2006.01) |
| G02F 1/133 | (2006.01) |
| G02F 1/1333 | (2006.01) |

(52) U.S. Cl.
CPC .... G02F 1/133512 (2013.01); G02F 1/13306 (2013.01); G02F 1/13338 (2013.01);
(Continued)

(58) Field of Classification Search
CPC ......... G02F 1/133308; G02F 1/133608; G02F 1/133512; G02F 1/13306; G02F 1/1338;
(Continued)

(56) References Cited

U.S. PATENT DOCUMENTS

| 6,337,727 B1 * | 1/2002 | Ono ................. G02F 1/133512 349/110 |
| 6,547,616 B1 | 4/2003 | Furukawa et al. |

(Continued)

FOREIGN PATENT DOCUMENTS

| CN | 1248713 A | 3/2000 |
| CN | 102608779 A | 7/2012 |

(Continued)

OTHER PUBLICATIONS

Extended European search report issued in corresponding European application No. 16782542.1 dated Feb. 8, 2018.

*Primary Examiner* — Nathanael R Briggs
*Assistant Examiner* — William D Peterson
(74) *Attorney, Agent, or Firm* — Young Basile Hanlon & MacFarlane, P.C.

(57) ABSTRACT

Provided are a display screen, a display screen assembly, and a terminal. The display screen includes a display panel and an optical film. The display panel includes a display surface and a side surface. The display surface is configured to display an image. The display surface includes a non-display region and a display region. The non-display region surrounds the display region. The side surface surrounds the periphery of the display surface. The optical film includes a lightproof portion and a light-transmitting portion. The light-transmitting portion is stacked on the display region, and correspondingly covers the display region. The lightproof portion is fixedly connected to the light-transmitting portion. The lightproof portion is stacked on the side surface (Continued)

and the non-display region, and correspondingly covers the side surface and the non-display region.

17 Claims, 4 Drawing Sheets

(52) U.S. Cl.
CPC .................. *G02F 1/133308* (2013.01); *G02F 2001/133331* (2013.01); *G02F 2001/133388* (2013.01); *G02F 2201/50* (2013.01)

(58) Field of Classification Search
CPC .......... G02F 2001/13331; G02F 2001/133388; G02F 2201/50
USPC .......................................................... 349/58
See application file for complete search history.

(56) References Cited

U.S. PATENT DOCUMENTS

| | | | |
|---|---|---|---|
| 7,830,595 B2* | 11/2010 | Hinata | ............... G02F 1/133308 359/245 |
| 2012/0169963 A1 | 7/2012 | Park | |
| 2013/0224436 A1* | 8/2013 | Kim | ........................... C09J 4/00 428/141 |
| 2014/0267980 A1 | 9/2014 | Kang et al. | |
| 2015/0036074 A1* | 2/2015 | Park | ......................... G02B 5/30 349/58 |
| 2016/0209568 A1* | 7/2016 | Shin | ..................... G02B 5/3083 |

FOREIGN PATENT DOCUMENTS

| | | |
|---|---|---|
| CN | 103513456 A | 1/2014 |
| CN | 203535335 U | 4/2014 |
| CN | 203786711 U | 8/2014 |
| CN | 203930733 U | 11/2014 |
| CN | 104315412 A | 1/2015 |
| CN | 104503129 A | 4/2015 |
| CN | 104865720 A | 8/2015 |
| CN | 204679739 U | 9/2015 |
| EP | 0985951 A2 | 3/2000 |
| EP | 2778772 A2 | 9/2014 |
| JP | 2008-129159 A | 6/2008 |
| JP | 2014-010294 A | 1/2014 |
| JP | 2014-182369 A | 9/2014 |
| KR | 20140114916 A | 9/2014 |
| KR | 20150015243 A | 2/2015 |
| WO | 2012115140 A1 | 8/2012 |

* cited by examiner

DISPLAY SCREEN, DISPLAY SCREEN ASSEMBLY, AND TERMINAL

TECHNICAL FIELD

The disclosure relates to a technical field of display screens, and in particular, to a display screen, a display screen assembly and a terminal.

BACKGROUND

Currently, display screens of many terminal devices have problems, such as light leakage, liquid invasion and so forth, while most of the current display screens have a structure in which a high-temperature resistant polyester film adheres to an edge of the display screen or an edge of a side frame, to achieve the shading and waterproof effect by using a high-temperature resistant polyester film. However, as more and more terminal devices are subject to narrow border requirement currently, the black border in the display region of the terminal device is becoming narrower and narrower, resulting in a reduction in the width of the high-temperature resistant polyester film. Moreover, since when the high-temperature resistant polyester film adheres to the display screen, the high-temperature resistant polyester film is required to be beyond the edge of the display screen and have a sufficient width so as to prevent defects such as bubbles or gaps from appearing at the edge of the display screen. As the border of the display screen assembly is becoming narrower and narrower, the width of the high-temperature resistant polyester film decreases, so that light-leakage prevention effect and waterproof effect cannot be achieved by using the high-temperature resistant polyester film.

SUMMARY

In view of this, a display screen assembly and a terminal are provided by the present disclosure, in order to solve the problems in display screens, such as light leakage, liquid invasion and so forth to improve the performance of display screens.

According to a first aspect, a display screen is provided. The display screen comprises a display panel and an optical film; the display panel comprises a display surface and a side surface; the display surface is configured to display an image; the display surface comprises a non-display region and a display region; the non-display region surrounds the display region; the side surface surrounds the periphery of the display surface; the optical film comprises a light-transmitting portion and a lightproof portion; the lightproof portion is stacked on the side surface and the non-display region, and corresponding covers the side surface and the non-display region; and the light-transmitting portion is stacked on the display region and correspondingly covers the display region.

In conjunction with the first aspect, in a first feasible embodiment of the first aspect, the display panel comprises a back surface disposed oppositely to the display surface; the back surface comprises an edge region corresponding to the non-display region; and the lightproof portion is further stacked on the edge region and corresponding covers the edge region.

In conjunction with any one of the first aspect or the first feasible embodiment of the first aspect, in a second feasible embodiment of the first aspect, the lightproof portion comprises a base layer and an ink layer which is disposed on the base layer.

In conjunction with the first aspect, in a third feasible embodiment of the first aspect, the optical film is formed from high-temperature resistant polyester material.

In conjunction with the first aspect, in a fourth feasible embodiment of the first aspect, the display screen is a touch screen.

In conjunction with the fourth feasible embodiment of the first aspect, in a fifth feasible embodiment of the first aspect, the display panel comprises a protective layer, a touch layer, a liquid crystal layer and a backlight layer which are stacked in sequence; and the display surface is disposed on the protective layer.

According to a second aspect, a display screen assembly is provided. The display screen assembly comprises any one of the above-mentioned display screens; the display screen assembly further comprises a side frame and a light-transmitting protective plate; the side frame surrounds the periphery of the light-transmitting protective plate; and the light-transmitting protective plate is stacked on the display screen, and at least covers the display region.

In conjunction with the second aspect, in a first feasible embodiment of the second aspect, the light-transmitting protective plate comprises a light-transmitting region and a lightproof region; the light-transmitting region covers the display region; and the lightproof region surrounds the light-transmitting region, and covers the non-display region.

In conjunction with the second aspect, in a second feasible embodiment of the second aspect, an optical bonding layer is connected between the display screen and the light-transmitting protective plate; and the optical bonding layer covers the display surface.

According to a third aspect, a terminal is provided. The terminal comprises the display screen assembly described above; the terminal further comprises a back cover and a control assembly; an accommodating chamber is disposed in the back cover; an opening of the accommodating chamber is located on the outer surface of the back cover; the display screen assembly covers the opening; the display screen and the control assembly are accommodated in the accommodating chamber; and the control assembly is electrically connected to the display screen to control the display screen.

By means of the display screen, the display screen assembly, and the terminal of the present disclosure, the lightproof portion of the optical film covers the non-display region of the display panel and covers the side surface of the display screen, so that the edge of the display screen is shaded by using the optical film, thereby achieving the light-leakage prevention effect and waterproof effect

BRIEF DESCRIPTION OF THE DRAWINGS

In order to more clearly describe technical solutions according to the present disclosure, the accompanying drawings to be used in the embodiments will be briefly introduced hereinafter. Apparently, the accompanying drawings described hereinafter are merely some embodiments of the present disclosure, and persons skilled in the art may also derive other drawings from these accompanying drawings without creative efforts.

DETAILED DESCRIPTION

In conjunction with the drawings in the embodiments of the present disclosure, a clear, complete description for the technical solutions in the embodiments of the present disclosure is provided below.

Figure 1:
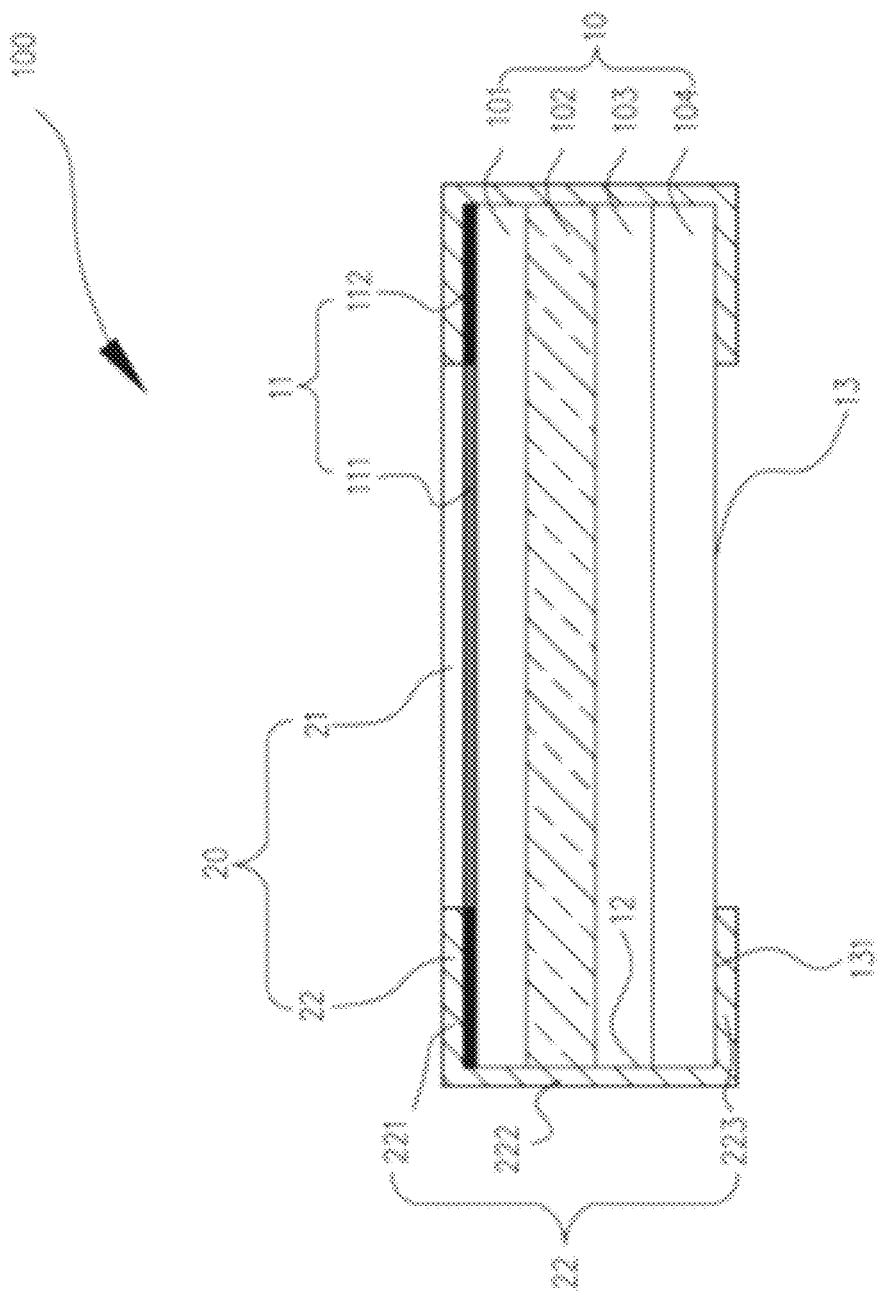
FIG. 1 is a schematic diagram of a display screen according to a first embodiment of the present disclosure.

As illustrated in FIG. 1, the present disclosure provides a display screen 100. The display screen 100 includes a display panel 10 and an optical film 20. The display panel includes a display surface 11 and a side surface 12. The display surface 11 is configured to display an image. The display surface 11 includes a display region 111 and a non-display region 112. In FIG. 1, the shadow region is the display region 111, and the black region is the non-display region 112. The non-display region 112 surrounds the display region 111. The side surface 12 surrounds the periphery of the display surface 11. The optical film 20 includes a light-transmitting portion 21 and a lightproof portion 22. The light-transmitting portion 21 is stacked on the display region 111, and correspondingly covers the display region 111. The lightproof portion 22 is fixedly connected to the light-transmitting portion 21. The lightproof portion 22 is stacked on the side surface 12 and the non-display region 112, and corresponding covers the side surface 12 and the non-display region 112.

The lightproof portion 22 of the optical film 20 covers the non-display region 112 of the display panel 10 and covers the side surface 12 of the display panel 10, so that the edge of the panel display 10 is shaded by using the optical film 20, thereby achieving the light-leakage prevention effect and waterproof effect.

In this embodiment, the display region 111 is a region of the display panel 10 in which images and information can be effectively displayed, and the non-display region 112 is a region of the display panel 10 in which images and information cannot be displayed. Generally, the non-display region 112 is configured for circuit connection or backlight disposition. The display region 111 appears black, when the display panel 10 is disconnected from electrical power. The display panel 10 may be a LCD (Liquid Crystal Display) screen, or a LCM (LCD Module) assembly. In at least one embodiment, the display panel 10 may be a widely used touch screen, for example, the display screen 10 may be an in-cell touch screen in which a touch layer is embedded into LCD pixels, or may be a on-cell touch screen in which a touch layer is disposed on LCD pixels, or may be a fully laminated touch screen in which a touch layer fully adheres to a covering plate.

In this embodiment, the optical film 20 is formed on the display panel 10 by means of a film deposition process, or the optical film 20 is fixed on the display panel 10 by means of adhesion. The optical film 20 may adhere to the display surface 11 and the side surface 12 without gap, thereby effectively improving the production quality of the display screen 100. The optical film 20 may be a film formed from high-temperature resistant polyester material. The lightproof portion 22 has a lightproof effect, and light cannot transmit through the lightproof portion 22. Meanwhile, the lightproof portion 22 further has high-temperature resistant, corrosion resistant, and waterproof performances, so that light is prevented from leaking from the periphery of the display panel 10, and the liquid-leakage prevention effect and liquid-invasion prevention effect are achieved. In at least one embodiment, the lightproof portion 22 includes a first lightproof portion 221 and a second lightproof portion 222. The first lightproof portion 221 is stacked on the non-display region 112, and corresponding covers the non-display region 112. The second lightproof portion 222 is integrated with the first lightproof portion 221. The second lightproof portion 222 is stacked on the side surface 12 and corresponding covers the side surface 12. The light-transmitting portion 21 has a fine light-transmission performance, and the light-transmitting portion 21 can be transmitted through by the light from the display region 111. The light-transmitting portion 21 is integrated with the first lightproof portion 221. The light-transmitting portion 21 is completely laid on the display region 111, thereby improving the stable structure of optical film 20. Thus, the entire optical film 20 covers the display panel 10, so that the lightproof portion 22 at the periphery of the display panel 10 is more stable, and the lightproof portion 22 cannot be readily removed from the display panel 10.

Furthermore, the display panel 10 includes a back surface 13 disposed oppositely to the display surface 11. The back surface 13 includes an edge region 131 corresponding to the non-display region 112. The lightproof portion 22 is further stacked on the edge region 131, and corresponding covers the edge region 131.

In this embodiment, the lightproof portion 22 further includes a third lightproof portion 223. The third lightproof portion 223 is integrated with the second lightproof portion 222, and the third lightproof portion 223 is stacked on the edge region 131. Thus, the lightproof portion 22 completely covers the periphery of the display panel 10. And, since the first lightproof portion 221, the second lightproof portion 222 and the third lightproof portion 223 are integrated with each other, the lightproof effect and the waterproof effect of the lightproof portion 22 are improved thereby improving the performance of the display screen 100.

Furthermore, the lightproof portion 22 is provided with an ink layer.

In this embodiment, the lightproof portion 22 includes a base layer which is disposed to be integrated with the light-transmitting portion 21. The ink layer is formed on a surface of the base layer which is far away from the display panel 10 by means of screen-printing. In at least one embodiment, the ink layer is printed on the base layer by using a mask with a preset number of meshes. The periphery of the display panel 10 is shaded by the ink layer, thereby achieving the light-leakage effect and effectively improving the display effect of the display screen 100. In other embodiments, non-transparent material can be added into the lightproof portion 22, so that the lightproof portion 22 has the lightproof effect.

Furthermore, the display screen 100 is a touch screen. In addition to displaying images and information, the display screen 100 can enable command reception by means of receiving touch signals so as to realize human-machine interaction when displaying images and information.

A first embodiment is provided, as illustrated in FIG. 1. The display panel 10 is an OGS (one-glass-solution) touch screen. The display panel 10 includes a protective layer 101, a touch layer 102, a liquid crystal layer 103 and a backlight layer 104 which are stacked in sequence. The display surface is disposed on the protective layer. In at least one embodiment, the protective layer 101 may be a light-transmitting glass cover plate, and the protective layer 101 protects the display panel 10, and enhances the stable structure of the display panel 10. The touch layer 102 is composed of a conductive layer (not shown) and an insulating layer (not shown). The touch layer 102 is configured to receive touch commands. The touch layer 102 may be integrated with the protective layer 101. On one hand, the thickness of the display panel 10 can be reduced, thereby reducing the material of the optical film 20 and in turn reducing the manufacturing cost of the display screen 100; on the other hand, the touch layer 102 fully adheres to the protective layer 101, thereby reducing the light refraction of the protective layer 101 and the touch layer 102, and reducing the impact of the optical film 20 on the refraction of the light from the display panel 10. The liquid crystal layer 103 is configured to displaying images according to pulse signals. The backlight layer 104 is configured to provide a black background for the display panel 10, resulting in clearer imaging on the liquid crystal layer 103. By means of the lightproof 22 covering the periphery of the display panel 10, the protective layer 101, the touch layer 102, the liquid crystal layer 103 and the backlight layer 104 are stacked more closely, thereby enhancing the stable structure of the display panel 10, and meanwhile, the lightproof portion 22 can further shade interfaces between the protective layer 101, the touch layer 102, the liquid crystal layer 103 and the backlight layer 104, thereby preventing light leakage from the layers of the display panel 10 and effectively improving the display effect of the display screen 100.

Figure 2:
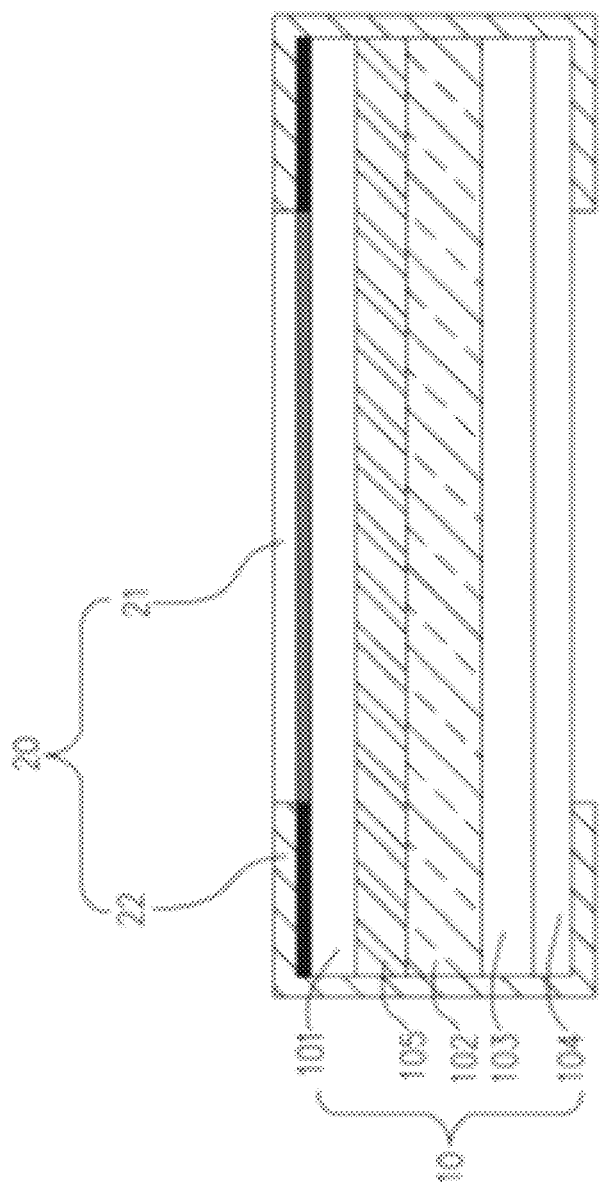
FIG. 2 is a schematic diagram of a display screen according to a second embodiment.

A second embodiment is provided, as illustrated in FIG. 2. The display panel 10 is an on-cell touch screen. Unlike the first embodiment, the display panel 10 further includes a polarizing layer. The touch layer 102 is integrated with the liquid crystal layer 103. In at least one embodiment, the polarizing layer 105, the touch layer 102 and the liquid crystal layer 103 are stacked in sequence and disposed integrally. Thus, the display panel 105 has a simple structure and is easy to manufacture. The optical film 101 is deposited on the protective layer 20.

Figure 3:
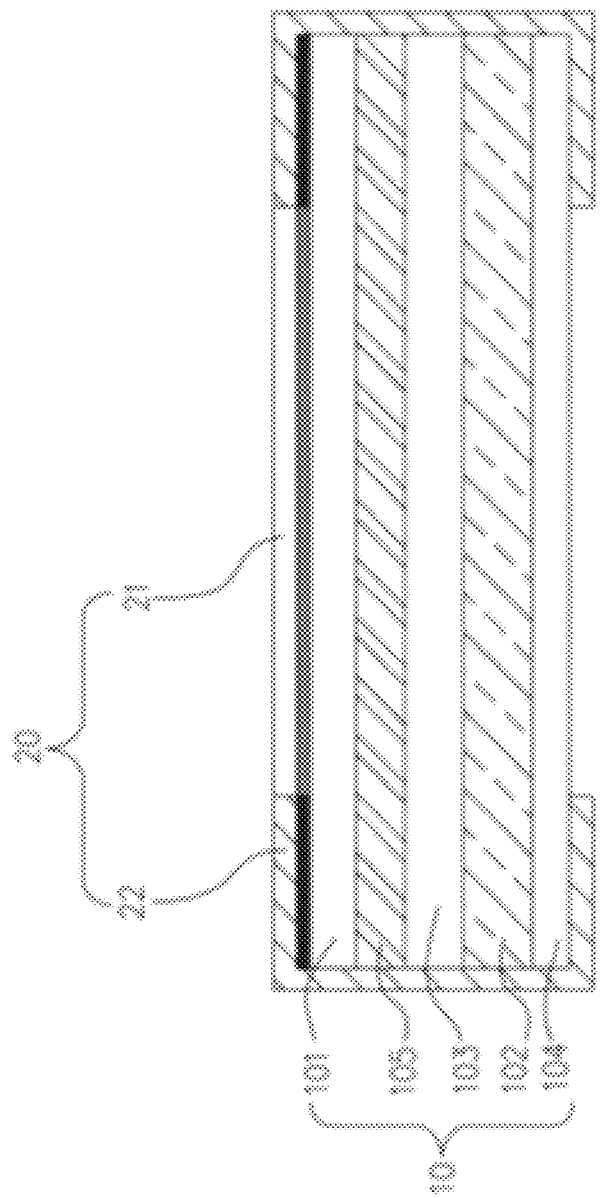
FIG. 3 is a schematic diagram of a display screen according to a third embodiment.

A third embodiment is provided, as illustrated in FIG. 3. The display panel 10 is an in-cell touch screen. Unlike the second embodiment, the polarizing layer 105, the liquid crystal layer 103 and the touch layer 102 are stacked in sequence and disposed integrally. Thus, the display panel 105 has a fine imaging effect, thereby preventing the optical film 20 from impacting the imaging effect of the display panel 10.

Figure 4:
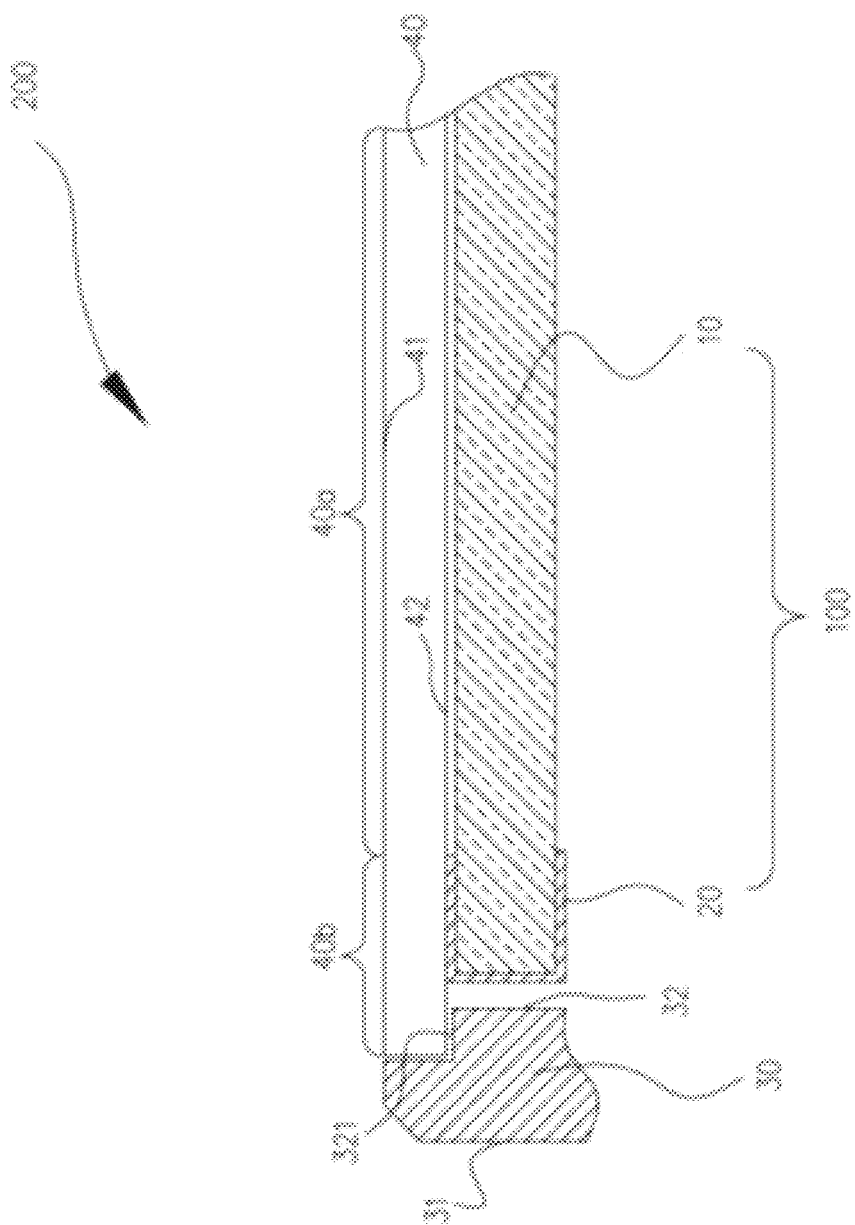
FIG. 4 is a schematic diagram of a display screen assembly provided by the present disclosure.

As illustrate FIG. 4, a display screen assembly 200 is further provided by the present disclosure. The display screen assembly 200 includes the display screen 100. The display screen assembly 200 further includes a side frame 30 and a light-transmitting protective plate 40. The side frame 30 surrounds the periphery of the light-transmitting protective plate 40. The light-transmitting protective plate 40 is stacked on the display screen 100, and at least covers the display region 111.

In this embodiment, the side frame 30 is made from plastic material. In addition to bearing the display screen 100 and the light-transmitting protective plate 40, the side frame 30 may further be of weakly polar material when the display touch screen 100 is a touch screen, so that the side frame 30 can have a function of transferring a fingerprint-induced electric field, in addition to having a fine insulating effect. The side frame 30 includes an outer side 31 and an inner side 32 which are disposed oppositely. The outer side 31 can serve as the outer surface of the side frame 30, and the inner side 32 can be combined with the light-transmitting protective plate 40. In at least one embodiment, the inner side 32 is provided with a step 321, and the periphery of the light-transmitting protective plate 40 is fixed on the step 321. In other embodiments, the side frame 30 may also be of metal material.

In this embodiment, the light-transmitting protective plate 40 is light-transmitting glass, and the cross section of the light-transmitting protective plate 40 is parallel with the display surface 11 of the display screen 100. The light-transmitting protective plate 40 is a rectangular plate piece. The light-transmitting protective plate 40 includes an upper surface 41 and a lower surface which are disposed oppositely. The upper surface 41 is oriented towards a user, and serves as an outer surface of the light-transmitting protective plate 40. The lower surface 42 is away from the user. Either of the upper surface 41 and the lower surface 42 is parallel with the display surface 11. The light-transmitting protective plate 40 enhances the light transmittance of the display screen 100, and enhances the visual effect of the display screen assembly 200. In addition, the light-transmitting protective plate 40 is a transparent rigid plate piece, so that the display screen 100 is well protected and a fine light-transmitting effect is achieved when the light-transmitting protective plate 40 is well combined with the side frame 30.

In this embodiment, the light-transmitting protective plate 40 includes a light-transmitting region 40a and a lightproof region 40b. The lightproof region 40b surrounds the light-transmitting region 40a, and covers the non-display region 112. The lightproof region 40b shades the non-display region 112 of the display panel 10, that is to say, the lightproof region 40b can shade the lightproof portion 22. The light-transmitting region 40a covers the display region 111, and the light from the display region 111 transmits through the light-transmitting region 40a, so that images and information displayed on the display screen 100 can be effectively viewed. In at least one embodiment, an ink layer 40c is printed on the lower surface 42 of the light-transmitting protective plate 40 correspondingly to the lightproof region 40b by means of screen-printing, so as to achieve the lightproof effect by using the ink layer 40c.

Furthermore, an optical bonding layer 50 is connected between the display screen 100 and the light-transmitting protective plate 40, and the optical bonding layer 50 covers the display surface 11.

In this embodiment, the optical bonding layer 50 is connected between the optical film 20 and the light-transmitting protective plate 40. The optical layer 50 may completely cover the lower surface 42. A distant between the edge of the lower surface 42 and the edge of the display screen 100 may be less than 0.6 mm, so that the side frame of the display screen assembly 200 can be narrower.

The present disclosure further provides a terminal (not shown) including the display screen assembly 200. The terminal further includes a back cover (not shown) and a control assembly (not shown). An accommodating chamber is disposed in the back cover (not shown). An opening of the accommodating chamber is located on the outer surface of the back cover. The display screen assembly 200 covers the opening. The display screen 100 and the control assembly are accommodated in the accommodating chamber. The control assembly is electrically connected to the display screen 100 to control the display screen 100. It is understood that, the terminal is a terminal device which may be a mobile phone, a notebook computer, a tablet computer, an electronic reader, an electronic album, a monitor, or the like.

By means of the display screen, the display screen assembly, and the terminal of the present disclosure, the lightproof portion of the optical film covers the non-display region of the display panel and covers the side surface of the display screen, so that the edge of the display screen is shaded by using the optical film, thereby achieving the light-leakage prevention effect and waterproof effect.

The foregoing is the embodiments of the present disclosure, and it should be noted that, persons skilled in the art could made some modifications and improvements without departing from the principle of the present disclosure. These modifications and improvements are intended to be included within the protection scope of the present disclosure.

What is claimed is:

1. A display screen, comprising:
a display panel and an optical film, wherein:
the display panel comprises a display surface and a side surface, wherein
the display surface is configured to display an image;
the display surface comprises a non-display region and a display region;
the non-display region surrounds the display region; and
the side surface surrounds a periphery of the display surface; and
the optical film comprises a light-transmitting portion and a lightproof portion, wherein:
the lightproof portion is formed by adding non-transparent material into the lightproof portion of the optical film and has a lightproof effect itself,
the light-transmitting portion is stacked on the display region and correspondingly covers the display region;
the lightproof portion is fixedly connected to the light-transmitting portion;
the lightproof portion is stacked on the side surface and the non-display region, and corresponding covers the side surface and the non-display region; and
the optical film is formed from polyester material with high-temperature resistant, corrosion resistant, and waterproof performances.

2. The display screen of claim 1, wherein the display panel comprises a back surface disposed oppositely to the display surface; the back surface comprises an edge region corresponding to the non-display region; and the lightproof portion is further stacked on the edge region and corresponding covers the edge region.

3. The display screen of claim 1, wherein the lightproof portion comprises a base layer and an ink layer which is disposed on the base layer.

4. The display screen of claim 1, wherein the display screen is a touch screen.

5. The display screen of claim 4, wherein the display panel comprises a protective layer, a touch layer, a liquid crystal layer and a backlight layer which are stacked in sequence; and the display surface is disposed on the protective layer.

6. A display screen assembly, comprising:
a display screen, a side frame, and a light-transmitting protective plate, wherein
the display screen comprises a display panel and an optical film, wherein
the display panel comprises a display surface configured to display an image and a side surface surrounding the periphery of the display surface, the display surface comprising a display region and a non-display region surrounding the display region, and
the optical film comprises a light-transmitting portion and a lightproof portion fixedly connected to the light-transmitting portion, the light-transmitting portion being stacked on the display region and correspondingly covering the display region, the lightproof portion being stacked on the side surface and the non-display region and corresponding covering the side surface and the non-display region, wherein the lightproof portion is formed by adding non-transparent material into the lightproof portion of the optical film and has a lightproof effect itself, wherein the optical film is formed from polyester material with high-temperature resistant, corrosion resistant, and waterproof performances;
the side frame surrounds the periphery of the light-transmitting protective plate; and
the light-transmitting protective plate is stacked on the display screen, and at least covers the display region.

7. The display screen assembly of claim 6, wherein the light-transmitting protective plate comprises a light-transmitting region and a lightproof region; the light-transmitting region covers the display region; and the lightproof region surrounds the light-transmitting region, and covers the non-display region.

8. The display screen assembly of claim 6, wherein an optical bonding layer is connected between the display screen and the light-transmitting protective plate; and the optical bonding layer covers the display surface.

9. A terminal, comprising:
a display screen assembly, a back cover and a control assembly, wherein the display screen assembly comprises a display screen, a side frame and a light-transmitting protective plate, wherein
the display screen comprises a display panel and an optical film, the display panel comprising a display surface configured to display an image and a side surface surrounding a periphery of the display surface, the display surface comprising a display region and a non-display region surrounding the display region, the optical film comprising a light-transmitting portion and a lightproof portion fixedly connected to the light-transmitting portion, the light-transmitting portion being stacked on the display region and correspondingly covering the display region, the lightproof portion being stacked on the side surface and the non-display region and corresponding covering the side surface and the non-display region, wherein the lightproof portion of the optical film is formed by adding non-transparent material into the lightproof portion of the optical film and has a lightproof effect itself, wherein the optical film is formed from polyester material with high-temperature resistant, corrosion resistant, and waterproof performances;
the side frame surrounds the periphery of the light-transmitting protective plate;
the light-transmitting protective plate is stacked on the display screen, and at least covers the display region;
an accommodating chamber is disposed in the back cover;
an opening of the accommodating chamber is located on an outer surface of the back cover;
the display screen assembly covers the opening;
the display screen and the control assembly are accommodated in the accommodating chamber; and
the control assembly is electrically connected to the display screen to control the display screen.

10. The display screen assembly of claim 6, wherein the display panel comprises a back surface disposed oppositely to the display surface; the back surface comprises an edge region corresponding to the non-display region; and the lightproof portion is further stacked on the edge region and corresponding covers the edge region.

11. The display screen assembly of claim 6, wherein the lightproof portion comprises a base layer and an ink layer which is disposed on the base layer.

12. The display screen assembly of claim 6, wherein the display screen is a touch screen.

13. The display screen assembly of claim 12, wherein the display panel comprises a protective layer, a touch layer, a liquid crystal layer and a backlight layer which are stacked in sequence; and the display surface is disposed on the protective layer.

14. The terminal of claim 9, wherein the display panel comprises a back surface disposed oppositely to the display surface; the back surface comprises an edge region corresponding to the non-display region; and the lightproof portion is further stacked on the edge region and corresponding covers the edge region.

15. The terminal of claim 9, wherein the lightproof portion comprises a base layer and an ink layer which is disposed on the base layer.

16. The terminal of claim 9, wherein the display screen is a touch screen.

17. The terminal of claim 16, wherein the display panel comprises a protective layer, a touch layer, a liquid crystal layer and a backlight layer which are stacked in sequence; and the display surface is disposed on the protective layer.

\* \* \* \* \*